US012812433B2

(12) United States Patent
Masri et al.

(10) Patent No.: US 12,812,433 B2
(45) Date of Patent: Nov. 24, 2026

(54) USER CONTEXT AWARE ML BASED CSI MEASUREMENT RELAXATION

(71) Applicant: Nokia Technologies Oy, Espoo (FI)

(72) Inventors: Ahmad Masri, Tampere (FI); Afef Feki, Massy (FR); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 18/490,541

(22) Filed: Oct. 19, 2023

(65) Prior Publication Data

US 2024/0147285 A1 May 2, 2024

(30) Foreign Application Priority Data

Oct. 28, 2022 (GB) ...................................... 2215959

(51) Int. Cl.
*H04W 24/10* (2009.01)
*H04L 41/16* (2022.01)

(52) U.S. Cl.
CPC ............. *H04W 24/10* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 10,244,441 | B2 | 3/2019 | Huang et al. | |
| 12,143,850 | B2 * | 11/2024 | Yao ...................... | H04B 17/309 |
| 2007/0207824 | A1 | 9/2007 | Bhattacharjee et al. | |
| 2022/0014955 | A1 * | 1/2022 | Yang ..................... | H04W 72/21 |

(Continued)

FOREIGN PATENT DOCUMENTS

| | | | |
|---|---|---|---|
| WO | 2019/014920 | A1 | 1/2019 |
| WO | 2021/098803 | A1 | 5/2021 |

(Continued)

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

(Continued)

*Primary Examiner* — Gregory B Sefcheck
*Assistant Examiner* — Benjamin Peter Welte
(74) *Attorney, Agent, or Firm* — Lippes Mathias LLP

(57) ABSTRACT

Various techniques are provided for a method including communicating, by a user equipment (UE) to a network device, a message including a measurement relaxation request, receiving, by the UE from the network device, a message including one of a measurement relaxation approval or a measurement relaxation denial, in response to receiving the measurement relaxation approval predicting, by the UE, a measurement relaxation configuration using a machine learning model, communicating, by the UE to the network device, a message including the measurement relaxation configuration, receiving, by the UE from the network device, a message including a measurement relaxation acknowledgement, and reporting, by the UE to the network device, measurements based on the measurement relaxation configuration.

15 Claims, 12 Drawing Sheets

(56) References Cited

U.S. PATENT DOCUMENTS

| | | | | |
|---|---|---|---|---|
| 2023/0125530 A1* | 4/2023 | Sharma | H04W 36/0088 | 370/329 |
| 2023/0413152 A1* | 12/2023 | Zhu | G06N 20/10 | |
| 2024/0147283 A1* | 5/2024 | Hu | H04W 52/367 | |
| 2024/0187903 A1* | 6/2024 | Hasegawa | H04B 17/328 | |
| 2024/0430723 A1* | 12/2024 | Okano | H04L 1/0026 | |
| 2025/0081019 A1* | 3/2025 | Li | H04W 24/08 | |
| 2025/0192865 A1* | 6/2025 | Ferrante | H04B 7/0695 | |

FOREIGN PATENT DOCUMENTS

| | | |
|---|---|---|
| WO | 2022/154525 A1 | 7/2022 |
| WO | 2022/189174 A1 | 9/2022 |

OTHER PUBLICATIONS

"3rd Generation Partnership Project; Technical Specification Group Radio Access Network; NR; Physical layer procedures for data (Release 17)", 3GPP TS 38.214, V17.1.0, Mar. 2022, pp. 1-225.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"5G; NR; Radio Resource Control (RRC); Protocol specification 3GPP TS 38.331 version 15.2.1 Release 15)", ETSI TS 138 331, V15.2.1, Jun. 2018, 299 pages.

"New SI: Study on Artificial Intelligence (AI)/Machine Learning (ML) for NR Air Interface", 3GPP TSG RAN Meeting #94e, RP-213599, Agenda Item: 8.6.1, Qualcomm, Dec. 6-17, 2021, 6 pages.

"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.

"5G NR Measurement Configuration: Meas Object, Report Config, Meas ID", Techplayon, Retrieved on Dec. 6, 2023, Webpage available at : https://www.techplayon.com/5g-nr-measurement-configuration-meas-object-report-config-meas-id/.

"3rd Generation Partnership Project; Technical Specification Group Radio Access Network; NR; User Equipment (UE) procedures in Idle mode and RRC Inactive state (Release 17)", 3GPP TS 38.304, V17.2.0, Sep. 2022, pp. 1-50.

"3rd Generation Partnership Project; Technical Specification Group Radio Access Network; NR; Requirements for support of radio resource management (Release 17)", 3GPP TS 38.133, V17.6.0, Jun. 2022, 3637 pages.

"Msc-generator", Sourceforge, Retrieved on Dec. 6, 2023, Webpage available at : https://sourceforge.net/projects/msc-generator/.

Combined Search and Examination Report received for corresponding United Kingdom Patent Application No. 2215959.4, dated Apr. 13, 2023, 5 pages.

* cited by examiner

USER CONTEXT AWARE ML BASED CSI MEASUREMENT RELAXATION

CROSS-REFERENCE TO RELATED APPLICATION

This application claims the benefit of Great Britain application No. 2215959.4 filed on Oct. 28, 2022 which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include communicating, by a user equipment (UE) to a network device, a message including a measurement relaxation request, receiving, by the UE from the network device, a message including one of a measurement relaxation approval or a measurement relaxation denial, and in response to receiving the measurement relaxation approval predicting, by the UE, a measurement relaxation configuration using a machine learning model, communicating, by the UE to the network device, a message including the measurement relaxation configuration, receiving, by the UE from the network device, a message including a measurement relaxation acknowledgement, and reporting, by the UE to the network device, measurements based on the measurement relaxation configuration.

According to another example embodiment, a method may include communicating, by a network device to a user equipment (UE), a message including a measurement relaxation request, receiving, by the network device from the UE, a message including a measurement relaxation response, predicting, by the network device, a measurement relaxation configuration using a machine learning model, and communicating, by the network device to the UE, a message including the measurement relaxation configuration.

According to yet another example embodiment, a method may include receiving, by a network device from a user equipment (UE), a message including a measurement relaxation request, determining, by the network device, one of a measurement relaxation approval or a measurement relaxation denial, in response to determining the measurement relaxation denial, communicating, by the network device to the UE, a message including the measurement relaxation denial, in response to determining the measurement relaxation approval determining, by the network device, whether the network is to configure a measurement relaxation configuration, or the UE is to configure the measurement relaxation configuration, in response to determining the UE is to configure the measurement relaxation configuration, communicating, by the network device to the UE, a message including the measurement relaxation approval, and in response to determining the network device is to configure the measurement relaxation configuration predicting, by the network device, the measurement relaxation configuration using a machine learning model, and communicating, by the network device to the UE, a message including the measurement relaxation configuration.

The details of one or more examples of embodiments are set forth in the accompanying drawings and the description below. Other features will be apparent from the description and drawings, and from the claims.

DETAILED DESCRIPTION

Figure 1A:
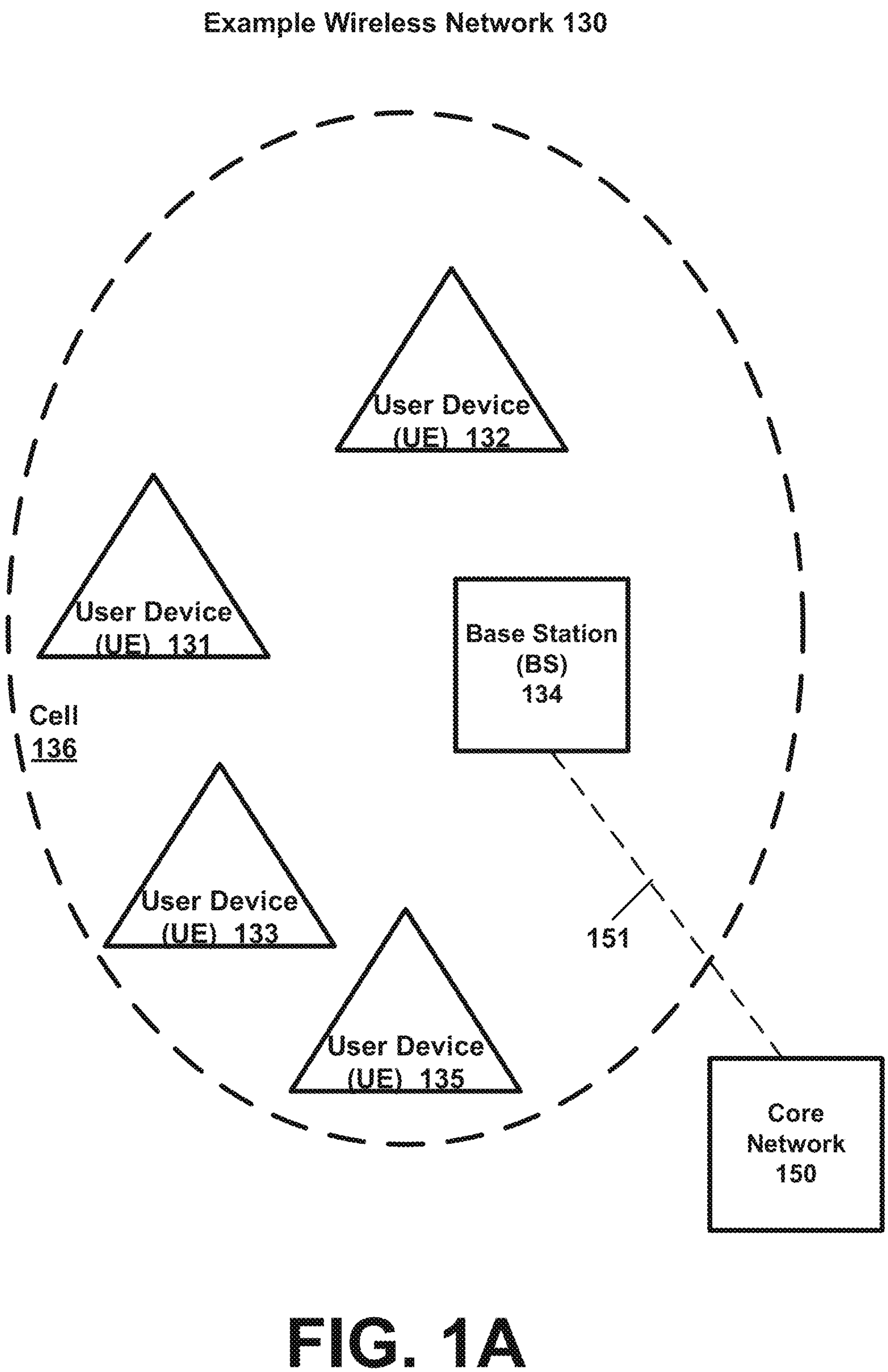
FIG. 1A is a block diagram of a wireless network according to an example embodiment.

FIG. 1A is a block diagram of a wireless network 130 according to an example embodiment. In the wireless network 130 of FIG. 1A, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5 GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

In a connected mode (e.g., RRC-Connected) with respect to a cell (or gNB or DU), the UE is connected to a BS/gNB, and the UE may receive data, and may send data (based on receiving an uplink grant). Also, in a connected mode, UE mobility may be controlled by the gNB or network.

In order to conserve power, a UE may, for example, transition from a connected state (e.g., RRC_Connected) to an unconnected state, such as an Idle state (e.g., RRC_Idle) or Inactive state (e.g., RRC_Inactive), e.g., in which the UE may sleep (a low power state) much of the time while in Idle or Inactive state. In Idle state or Inactive state, the UE does not have a connection established with any cell, and mobility (e.g., determining which cell the UE will be camped on or which cell to select as the serving cell for the UE) is controlled by the UE. Inactive state (e.g., RRC_Inactive) may also be referred to as a suspended state of the UE. While in Idle state or Inactive state, the UE may sleep much of the time, and then periodically wake (e.g., changing from a low power state to a full-power state) to perform one or more tasks or processes.

In wireless access networks, radio measurements can be crucial for major procedures such as radio resource management (including scheduling and handover). Generally, the gNB indicates to the UE the measurement configuration. The measurement configuration can be included in an RRC Reconfiguration message or an RRC Resume message. The measurement configuration can indicate that the network can update the measurement configuration for the UE while the UE is in a connected mode, resuming from inactive to connected mode or provide a new measurement configuration in the handover command.

The network (e.g., gNB) may communicate a measurement configuration to the UE causing the UE to perform the measurements. The measurements can include, for example, NR measurements and inter-RAT measurements of E-UTRA frequencies. The network (e.g., gNB) may communicate a measurement configuration to the UE causing the UE to report measurements. The measurements can include, for example, information based on SS/PBCH block(s) and CSI-RS resources, measurement results per SS/PBCH block, measurement results per cell based on SS/PBCH block(s), SS/PBCH block(s) indexes, measurement results per CSI-RS resource, measurement results per cell based on CSI-RS resource(s), and/or CSI-RS resource measurement identifiers. The measurement configuration can be structured with, for example, measurement objects, reporting configurations, measurement identities, quantity configurations, and/or measurement gap configurations.

Figure 1B:
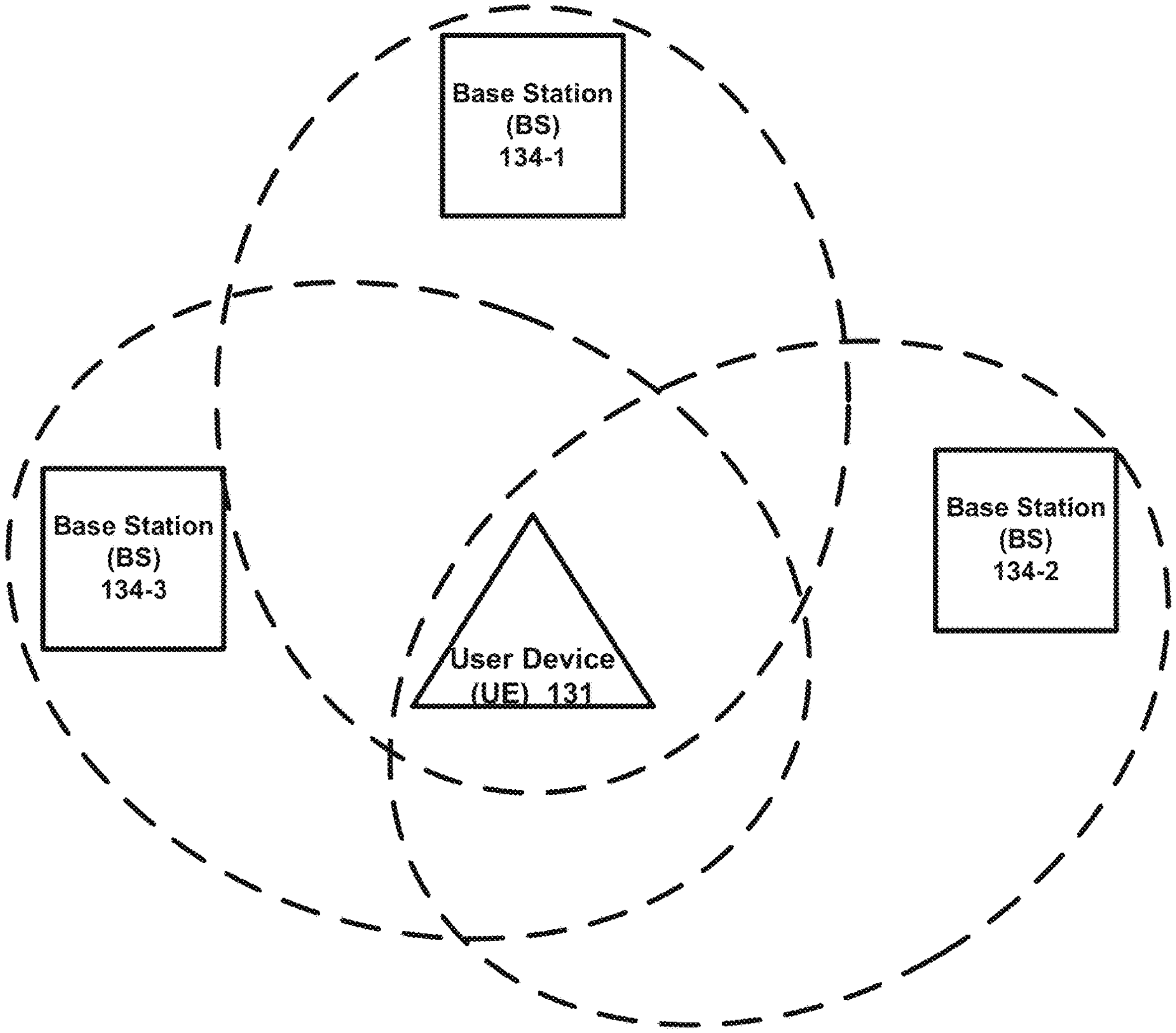
FIG. 1B is a block diagram of neighbor wireless network according to an example embodiment.

FIG. 1B is a block diagram of neighbor wireless network according to an example embodiment. As shown in FIG. 1B, the UE 131 can be in a serving cell associated with BS 134-1. At the same time, the UE 131 can be within neighbor cells associated with BS 134-2 and BS 134-3. In some implementations, the UE 131 can be configured to make and report neighbor signal measurements.

The UE 131 can be configured to measure the neighbor signal transmitting on the same frequency while simultaneously transmitting and receiving data from the serving cell. While measuring cell operating at different frequency (inter frequency neighbors) and Other RAT (LTE is other RAT for 5G NR) mobile has to suspend communication (Tx/Rx) with serving cell and needs to tune RF module to configured frequencies and resume connection with serving cell after some duration. The time duration during which mobile suspends it communication with serving cell to measure inter frequency neighbor or other RAT neighbor is known as a measurement gap. The measurement gap can be configured as a measurement gap lengths (MGL), for example, 1.5 ms, 3 ms, 3.5 ms, 4 ms, 5.5 ms and 6 ms and a measurement gap repetition period (MGRP), for example, 20 ms, 40 ms, 80 ms and 160 ms.

The UE 131 can be configured to report channel state information (CSI). The time and frequency resources that can be used by the UE 131 to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINTR. Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator).

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH'CSI reporting, the configured periodicity and slot offset applies in the numerology of the UL BWP in which the CSI report is configured to be transmitted on. The higher layer parameter reportQuantity indicates the CSI-related, L1-RSRP-related or L1-SINR-related quantities to report.

In NR, with the introduction of additional carrier frequencies and massive MIMO, the list of cells, beams, and frequencies to measure can become very high during conventional radio resource management procedures (such as handover). Therefore, during the measurements collection and reporting process, the UE can perform unnecessary measurements. These measurements can cause problems such as excessive power consumption and misuse of radio resources (e.g., when UE is immobile). In addition, in some cases, the UE can miss measurements from necessary targets (e.g., potential targets which must be measured due to UE mobility towards those targets but not still configured by the network) which can lead to performance degradation.

The reported measurements using a network only configuration can be used as input for a machine learned (ML) model (e.g., running at gNB level). Accordingly, the aforementioned issues can impact the inference process and lead to less-than-optimal ML outputs (e.g., predictions). Further, a CSI prediction performed by the UE or network may require measurements be reported even if the UE is, for example, in a cell center. In other words, reporting neighbor measurement when the UE is unlikely to transition to the neighbor cell.

Example implementations can solve these problems by using a ML model processed by the UE that can be configured to determine when to measure and when not to measure. This is in contrast to what to measure/what not to measure (cells/beams which is being pursued in other tracks). By determine when to measure and when not to measure the network can configure a UE to report the instance of time to the network if the UE will perform measurements or not and in what time window it does not plan to measure. The UE can report this in an uplink message. This can help the network by, for example, enabling the network to determine when to configure measurement gaps (or release already configured measurement gaps). The network can adapt the gap configuration to the UE in a downlink message. As a result of this new procedure, the network can cancel configuring measurement gaps to the UE in cases that would not be necessary based on feedback from the UE (prediction). Accordingly, the UE can be prevented from unnecessary switching off transmission and reception to the carriers according to the network gap configuration. In addition, data throughput on the existing carriers that the UE is configured with can be improved.

The UE may save battery power as a result of not measuring (or reporting) the window of time which it predicts that it is a good relaxation period because the UE may not perform any measurements. In example implementations, the UE AL/ML based prediction identifying when to perform a relaxation period in which measurements collection or reporting saving is possible. This is regardless of what the user is measuring and/or reporting (e.g., any CSI which may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR).

Example implementations can include a framework targeting radio measurement relaxation based on UE context (e.g., based on UE speed, trajectory, information UE is aware of based on the deployment scenario—known structure of the base station grid of beams, local sensors, and the like). Example implementations can make use of an ML model that estimates the optimal reporting period as function of inputs provided by UE. Alternatively (or in addition), the ML model can be provided by the network (training realized at the network) and then used by the UE to predict the optimal measurement period.

Figure 2:
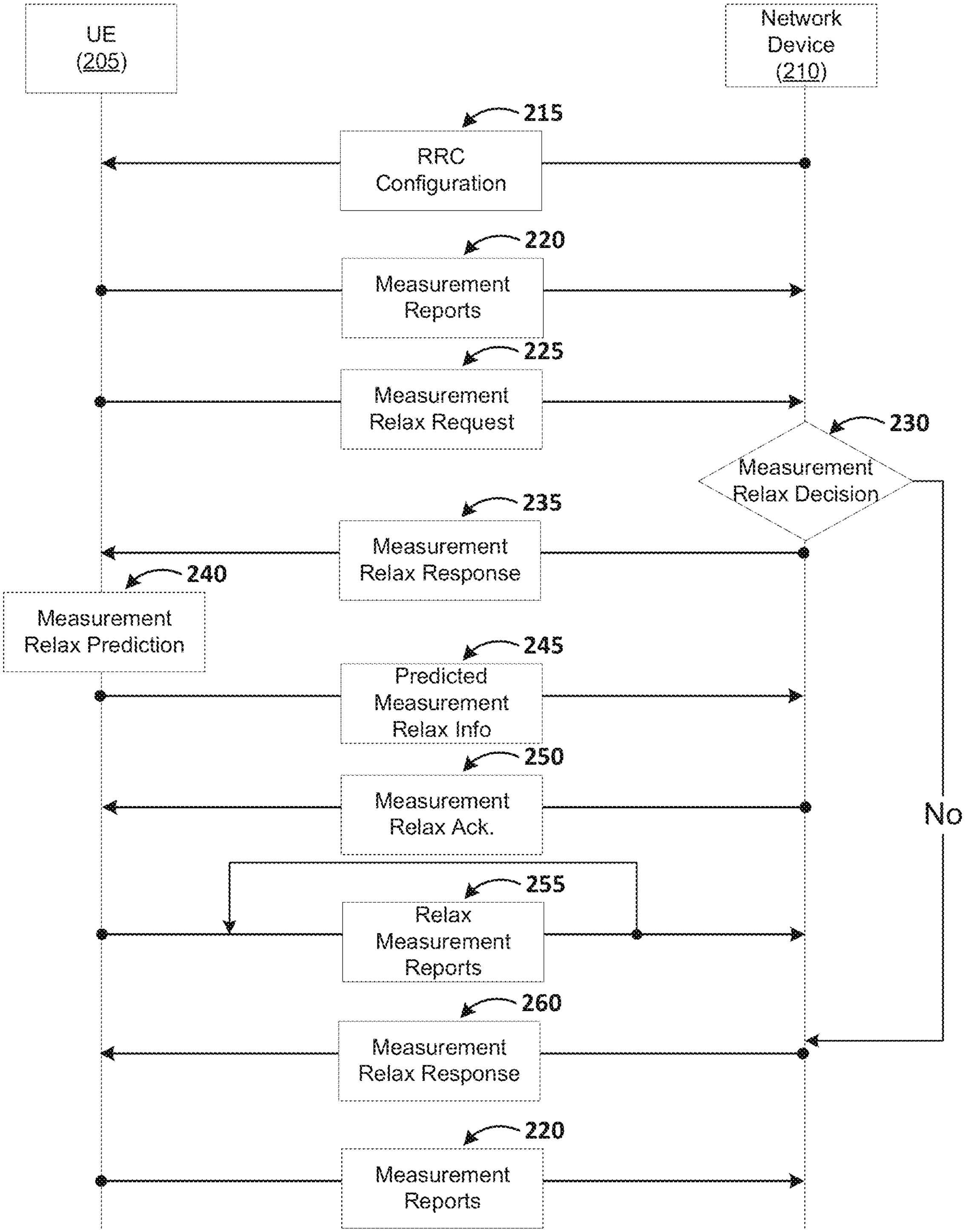
FIG. 2 is a flow diagram illustrating determining measurement relaxation according to an example embodiment.

FIG. 2 is a flow diagram illustrating determining measurement relaxation according to an example embodiment. As shown in FIG. 2, a wireless system can include a UE 205 and a network device 210. The UE 205 and/or the network device 210 can be configured to communicate (e.g., wirelessly communicate) between each other. For example, the UE 205 and the network device 210 can be configured to communicate messages, signals and/or the like between each other. For example, the UE 205 and/or the network device 210 can be configured to communicate using a wireless standard as described above.

The network device 210 can communicate a message 215 (e.g., a configuration message or signal) to the UE 205. The message 215 can include information (e.g., instructions) for configuration and/or indication of measurements to be made and/or reported by the UE 205. For example, the message 215 can include a radio resource control (RRC) configuration. The measurements can be measurements (e.g., reference signal received power (RSRP)) associated with serving and neighbor cell downlink signals, as well as broadcast channels. The UE 205 can make and report the measurements. The UE 205 can communicate a message 220 (e.g., a message or signal) to the network device 210. The message 220 can include measurement information associated with the configuration received in message 215.

The UE 205 can communicate a message 225 (e.g., a message or signal) to the network device 210. The message 225 can include a measurement relaxation request. A measurement relaxation can be a procedure for power consumption reduction. The measurement relaxation request can be a request by the UE 205 for the network device 210 to allow the UE 205 to reduce measurements associated with a serving cell and/or a neighbor cell. In other words, relaxation for UEs can be under network control.

In block 230, the network device 210 makes a measurement relaxation decision. If the decision is a measurement relaxation denial, processing continues with the network 210 communicating a message 260 (e.g., a configuration message or signal) to the UE 205. If the decision is a measurement relaxation approval, the network device 210 can communicate a message 235 (e.g., a configuration message or signal) to the UE 205. At cell level, based on the different measurement reporting covering the whole cell area (with the usual periodicity), explore the different relaxation options and their impact on expected output (e.g., target cell and beam prediction). The output of the analysis is an approximation on the boundaries of possible measurement collection and reporting relaxation periods, such as but not limited to time limits for the maximum/minimum relaxation period, and/or exceptions for some frequencies (cells/beams) that the relaxation must not include them.

The message 235 can include a measurement relaxation response. The measurement relaxation response can indicate that the UE can use the ML model configured to determine when to measure and when not to measure. The measurement relaxation decision can be based on UE 205 mobility status (e.g., serving cell variation, speed, movement, direction, cell re-selection, UE type, and the like), link quality (e.g., serving cell threshold/quality, position in cell, and the like), serving cell beam status (e.g., beam change, direction, beam specific link condition, and the like) and the like. The measurement relaxation decision can treat the UE 205 not being at cell edge and the UE 205 being stationary or with low mobility as being a higher priority than other decision factors. The gaps and/or boundaries can be communicated to the UE 205 and the UE 205 can be triggered to find the optimal relaxation periods.

In block 240, the UE 205 makes a measurement relaxation prediction. For example, measurement relaxation by allowing measurements with longer intervals, and/or by reducing the number of cells/carriers/SSB to be measured can be beneficial with regard to the problems discussed above. The measurement relaxation prediction can use a ML model. The ML model can be a regression model in a chained regression (e.g., where the output of a step is the input to a next step. An example ML model is discussed in more detail below with regard to FIGS. 8A-8C. Using the ML model, the UE 205 can predict the optimal measurement relaxation period based on a network relaxation boundary limit(s) input(s) and using, for example, context, trajectory, speed information. The UE 205 can predict measurement and reporting relaxation periods (e.g., longer periods for cell center users, and short periods for edge users).

The UE 205 can communicate a message 245 (e.g., a message or signal) to the network device 210. The message 220 can include the predicted measurement relaxation configuration. For example, the message 245 can include the predicted measurement and reporting relaxation periods. The network device 210 can communicate a message 250 (e.g., a message or signal) to the UE 205. The message 250 can include an ACK/NACK regarding the predicted measurement relaxation configuration. In response to receiving the ACK information, the UE 205 can start to collect and report measurements based on the UE 205 predicted relaxation periods and the network device 210 can account for the expected reported measurements periodicity and update the network device 210 procedures according. In response to receiving a NACK the UE will continue following the measurements reporting periodicity that has been set normally the network. The Periods prediction could be in the order of minimum time step. Therefore, the ML model can predict N steps starting from the prediction time, during those next N steps there may be no measurement reporting.

The UE 205 can make and report the measurements based on the predicted measurement relaxation configuration. The UE 205 can communicate a message 255 (e.g., a message or signal) to the network device 210. The message 220 can include measurement information associated with the predicted measurement relaxation configuration as predicted in block 240. The UE can make and report the measurements based on the predicted measurement relaxation configuration repeatedly until instructed otherwise by the network device 210. The UE 205 can repeatedly communicate the message 255 to the network device 210.

As discussed above, if the measurement relaxation decision is a measurement relaxation denial, processing continues with the network 210 communicating the message 260 (e.g., a configuration message or signal) to the UE 205. The UE 205 can make and report the measurements. The UE 205 can communicate a message 220 (e.g., a message or signal) to the network device 210. The message 220 can include measurement information associated with the configuration (e.g., RRC configuration) received in message 215.

Figure 3:
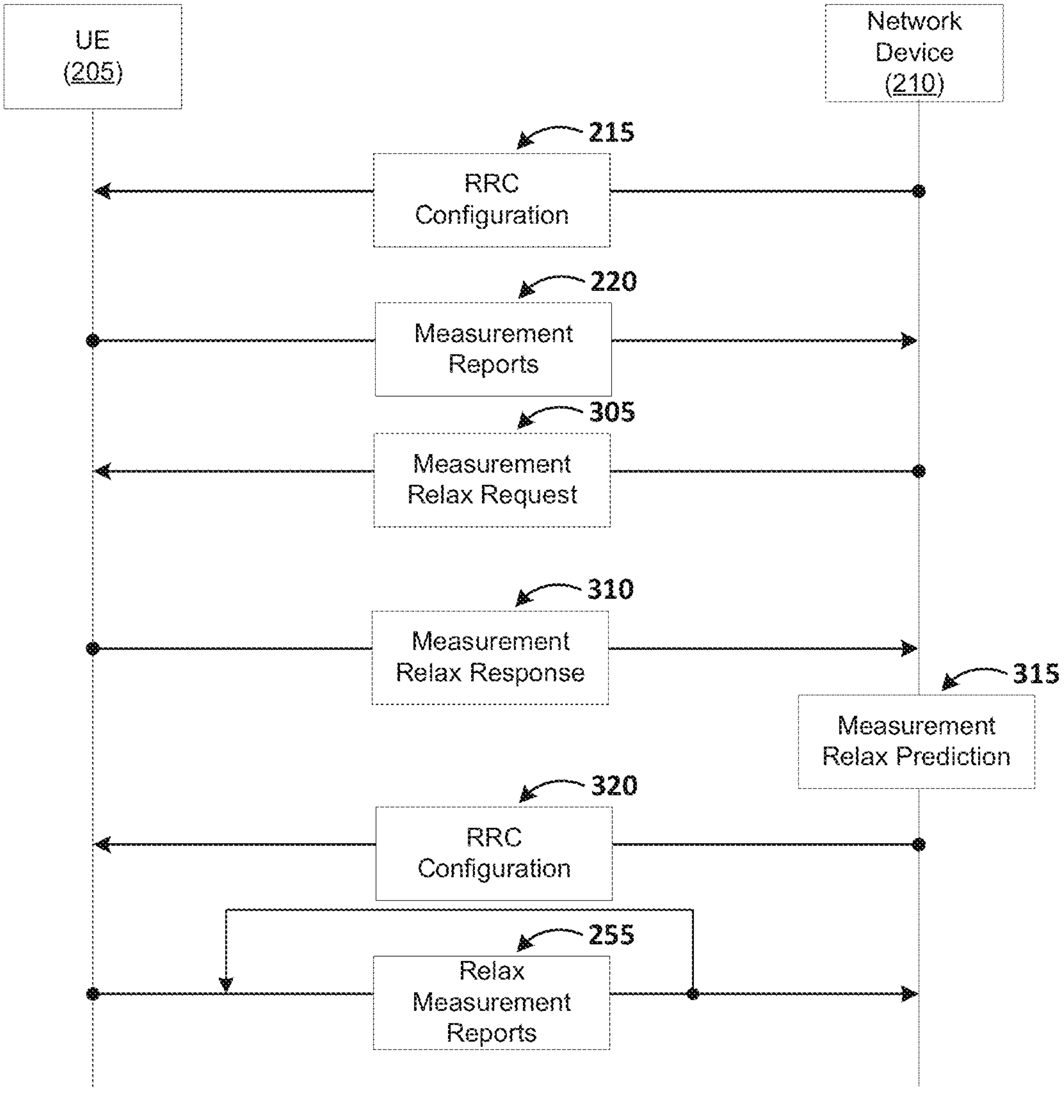
FIG. 3 is another flow diagram illustrating determining measurement relaxation according to an example embodiment.
Figure 4:
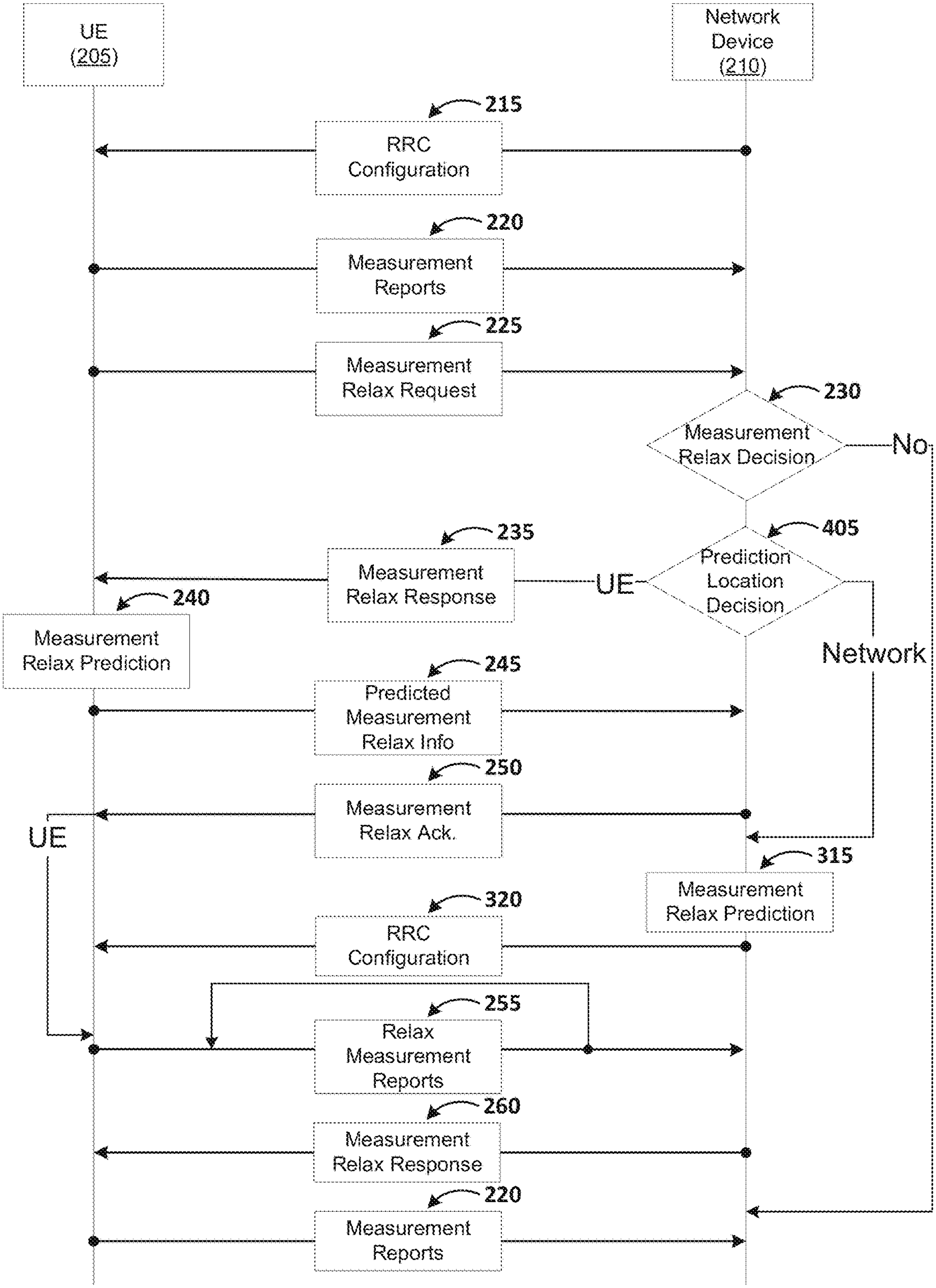
FIG. 4 is yet another flow diagram illustrating determining measurement relaxation according to an example embodiment.

The use of similar or identical reference numbers in the FIG. 3 and/or FIG. 4 is intended to indicate the presence of a similar or identical element or feature as described in FIG. 2. FIG. 3 is another flow diagram illustrating determining measurement relaxation according to an example embodiment. In this example implementation, the network device 210 can be configured to predict the measurement relaxation configuration and configure the UE 205 to measure and report based on the predicted measurement relaxation configuration. Message 215 and message 220 are described with regard to FIG. 2.

The network device 210 can communicate a message 305 (e.g., a message or signal) to the UE 205. The message 305 can include a measurement relaxation request. A measurement relaxation can be a procedure for power consumption reduction. The measurement relax request can be a request by the network device 210 for the UE 205 to indicate that the UE 205 can (e.g., is configured to) reduce measurements associated with a serving cell and/or a neighbor cell. The measurement relaxation request can include a request for possible (optional) preferences, for example, speeds, trajectory, battery level, sensor information, and/or the like. The UE 205 can communicate a message 310 (e.g., a message or signal) to the network device 210. The message 310 can include a measurement relaxation response. The measurement relaxation response can indicate that the UE 205 can use measurement relaxation. The measurement relaxation response can include the possible (optional) preferences, for example, speeds, trajectory, battery level, sensor information, and/or the like.

In block 315, the network device 210 makes a measurement relaxation prediction. For example, measurement relaxation by allowing measurements with longer intervals, and/or by reducing the number of cells/carriers/SSB to be measured can be beneficial with regard to the problems discussed above. The measurement relaxation prediction can use a ML model. The ML model can be a regression model in a chained regression (e.g., where the output of a step is the input to a next step. An example ML model is discussed in more detail below with regard to FIGS. 8A-8C. Using the ML model, the network device 210 can predict the optimal measurement relaxation period based on a network relaxation boundary limit(s) input(s) and using, for example, context, trajectory, speed information. The network device 210 can predict measurement and reporting relaxation periods (e.g., longer periods for cell center users, and short periods for edge users). The network device 210 can make use of the pre-trained ML model in order to estimate the optimal measurement relaxation period based on the UE preferences and the relaxation boundary limits.

The network device 210 can communicate a message 320 (e.g., a configuration message or signal) to the UE 205. The message 320 can include information (e.g., instructions) for configuration and/or indication of measurements to be made and/or reported by the UE 205. For example, the message 320 can include the predicted measurement relaxation configuration (as predicted by the network device 210). Message 255 is described above with regard to FIG. 2.

In an example implementation, for new coming user devices with side-link capabilities can obtain a measurement relaxation configuration from neighbor user devices with side-link capabilities. This indication can allow the new user to initiate a relaxation request.

The use of similar or identical reference numbers in FIG. 4 is intended to indicate the presence of a similar or identical element or feature as described in FIG. 2 and/or FIG. 3. FIG. 4 is yet another flow diagram illustrating determining measurement relaxation according to an example embodiment. Message 215, message 220 and message 225 are described with regard to FIG. 2. The measurement relaxation decision of block 230 is described with regard to FIG. 2. If the decision is a measurement relaxation approval, the network device 210 can decide (block 405) whether the UE 205 or the network device 210 is to predict the measurement relaxation configuration. In other words, in block 405 the network device 210 can decide whether the UE 205 or the network device 210 is to execute the ML model to predict the measurement relaxation configuration.

If the UE 205 is to predict the measurement relaxation configuration, message 235, message 245, message 250, and message 255 are communicated as described above in FIG. 2. In addition, block 240 is executed as described above in FIG. 2. If the network device 210 is to predict the measurement relaxation configuration, message 320, and message 255 are communicated as described above in FIG. 2 and FIG. 3. In addition, block 315 is executed as described above in FIG. 3.

Example 1

Figure 5:
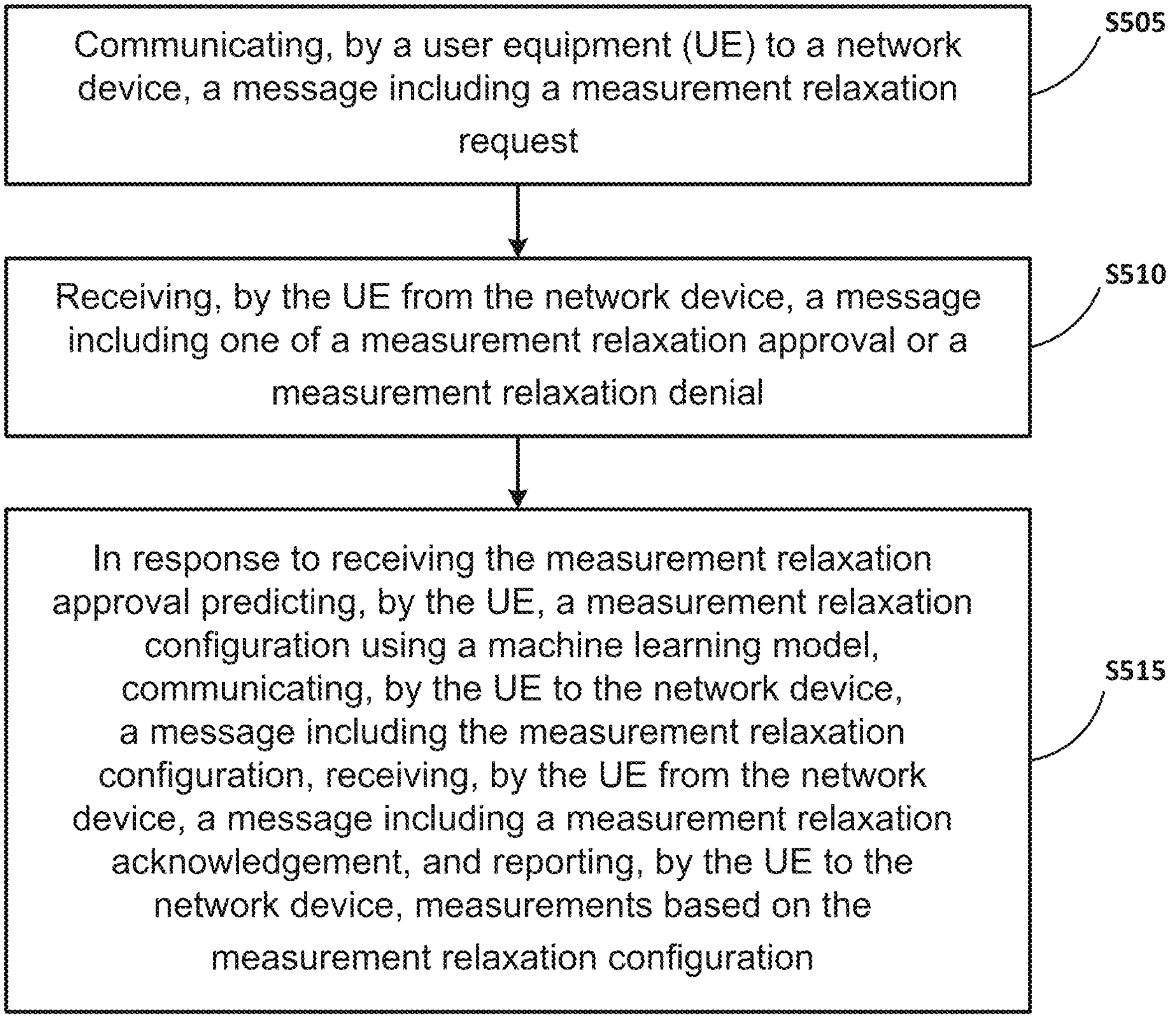
FIG. 5 is a block diagram of a method of operating a user equipment according to an example embodiment.

FIG. 5 is a block diagram of a method of operating a user equipment according to an example embodiment. As shown in FIG. 5, in step S505 communicating, by a user equipment (UE) to a network device, a message including a measurement relaxation request. In step S510 receiving, by the UE from the network device, a message including one of a measurement relaxation approval or a measurement relaxation denial. In step S515 in response to receiving the measurement relaxation approval predicting, by the UE, a measurement relaxation configuration using a machine learning model, communicating, by the UE to the network device, a message including the measurement relaxation configuration, receiving, by the UE from the network device, a message including a measurement relaxation acknowledgement, and reporting, by the UE to the network device, measurements based on the measurement relaxation configuration.

Example 2

The method of Example 1, wherein in response to receiving the measurement relaxation denial, reporting, by the UE to the network device, measurements based on conventional radio resource control measurements configuration from the network.

Example 3

The method of Example 1, wherein the measurement relaxation request can include UE preferences information, and the UE preference information can include at least one of UE speed, trajectory, and battery level.

Example 4

The method of Example 1, wherein the measurement relaxation approval can include time gap boundaries and per measurement type rules.

Example 5

The method of Example 1, wherein the predicting of the measurement relaxation configuration includes predicting an optimal measurement relaxation period based on the time gap boundaries and the measurement rules.

Example 6

The method of Example 1, wherein the machine learning model can include an input including at least one of a context information, a trajectory information, a speed information, and local received measurements.

Example 7

The method of Example 1, wherein the measurement relaxation configuration can include measurement relaxation periods indicating when and for how long measurements are made and when measurements are not made.

Example 8

The method of example 1, wherein the measurement relaxation configuration can indicate a different rate of reporting measurement times than a radio resource control measurements configuration.

Example 9

Figure 6:
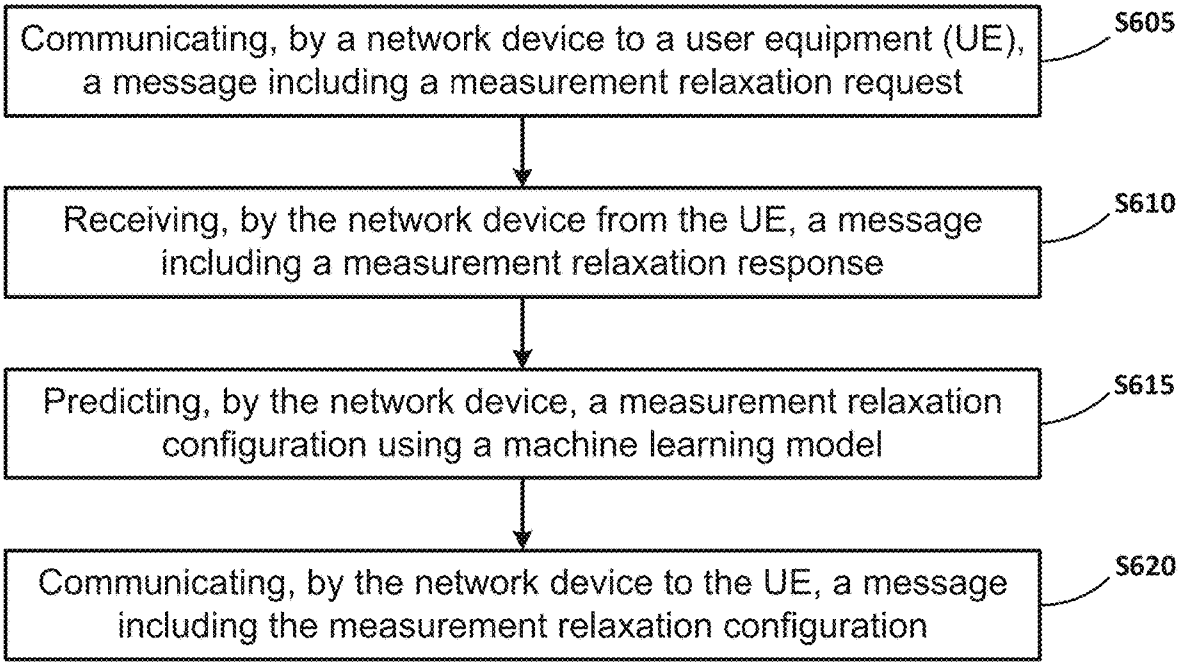
FIG. 6 is a block diagram of a method of operating a network device according to an example embodiment.

FIG. 6 is a block diagram of a method of operating a network device according to an example embodiment. As shown in FIG. 6, in step S605 communicating, by a network device to a user equipment (UE), a message including a measurement relaxation request. In step S610 receiving, by the network device from the UE, a message including a measurement relaxation response. In step S615 predicting, by the network device, a measurement relaxation configuration using a machine learning model. In step S620 communicating, by the network device to the UE, a message including the measurement relaxation configuration.

Example 10

The method of Example 9, wherein the message including the measurement relaxation request can include a request for UE preference information, the message including the measurement relaxation response can include the UE preference information, and the UE preference information can include at least one of UE speed, trajectory, and battery level.

Example 11

The method of Example 9, wherein the measurement relaxation configuration can indicate a different rate of measurement reporting times than a radio resource control measurements configuration.

Example 12

The method of Example 9 can further include detecting, by the network device, a new UE, determining, by the network device, that the new UE includes side link capabilities, and communicating, by the network device to the new UE, a message including the measurement relaxation configuration.

Example 13

The method of Example 9 can further include receiving, by the network device from the UE, a message including measurements based on the measurement relaxation configuration.

Example 14

Figure 7:
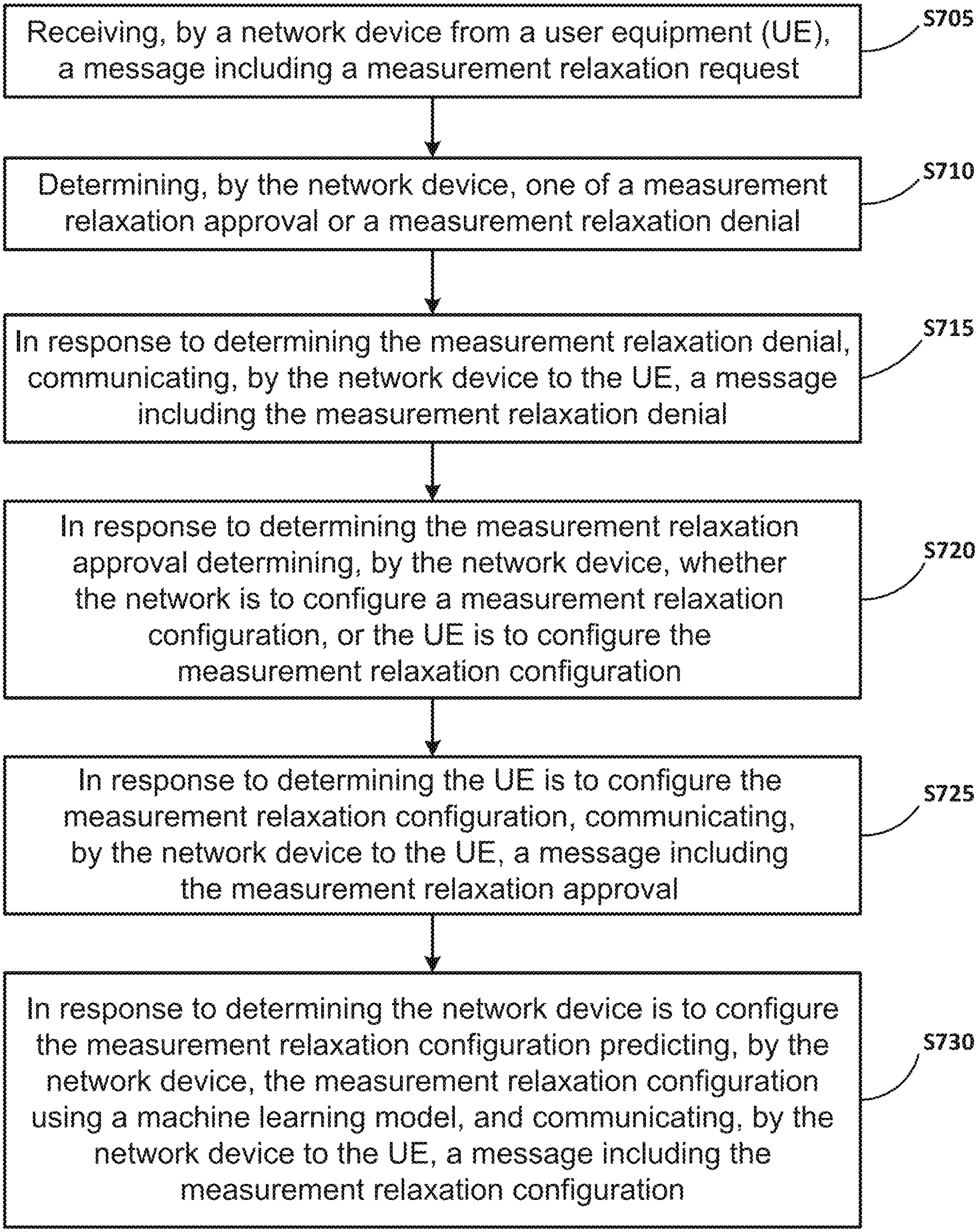
FIG. 7 is a block diagram of a method of operating a network device according to an example embodiment.

FIG. 7 is a block diagram of a method of operating a network device according to an example embodiment. As shown in FIG. 7, in step S705 receiving, by a network device from a user equipment (UE), a message including a measurement relaxation request. In step S710, determining, by the network device, one of a measurement relaxation approval or a measurement relaxation denial. In step S715 in response to determining the measurement relaxation denial, communicating, by the network device to the UE, a message including the measurement relaxation denial. In step S720 in response to determining the measurement relaxation approval determining, by the network device, whether the network is to configure a measurement relaxation configuration, or the UE is to configure the measurement relaxation configuration. In step S725 in response to determining the UE is to configure the measurement relaxation configuration, communicating, by the network device to the UE, a message including the measurement relaxation approval. In step S730 in response to determining the network device is to configure the measurement relaxation configuration predicting, by the network device, the measurement relaxation configuration using a machine learning model, and communicating, by the network device to the UE, a message including the measurement relaxation configuration.

Example 15

The method of Example 14 can further include receiving, by the network device from the UE, a message including measurements based on the measurement relaxation configuration.

Example 16

The method of Example 14, wherein the measurement relaxation request can include UE conditional information, and the UE conditional information includes at least one of UE speed, trajectory, and battery level.

Example 17

The method of Example 14, wherein the measurement relaxation approval can include time gap boundaries and measurement rules.

Example 18

The method of Example 14, wherein the predicting of the measurement relaxation configuration can include predicting an optimal measurement relaxation period based on the time gap boundaries and the measurement rules.

Example 19

The method of Example 14, wherein the machine learned model can include an input including at least one of a context information, a trajectory information, and a speed information.

Example 20

The method of Example 14, wherein the measurement relaxation configuration can include measurement relaxation periods indicating when measurements are made and for how long, and when measurements are not made.

Example 21

The method of Example 14, wherein the measurement relaxation configuration can indicate a different rate of reporting measurement times than a radio resource control measurements configuration.

Example 22

A method can include any combination of one or more of Example 1 to Example 21.

Example 23

A non-transitory computer-readable storage medium comprising instructions stored thereon that, when executed by at least one processor, are configured to cause a computing system to perform the method of any of Examples 1-22.

Example 24

An apparatus comprising means for performing the method of any of Examples 1-22.

Example 25

An apparatus comprising at least one processor and at least one memory including computer program code, the at least one memory and the computer program code configured to, with the at least one processor, cause the apparatus at least to perform the method of any of Examples 1-22.

Figure 8A:
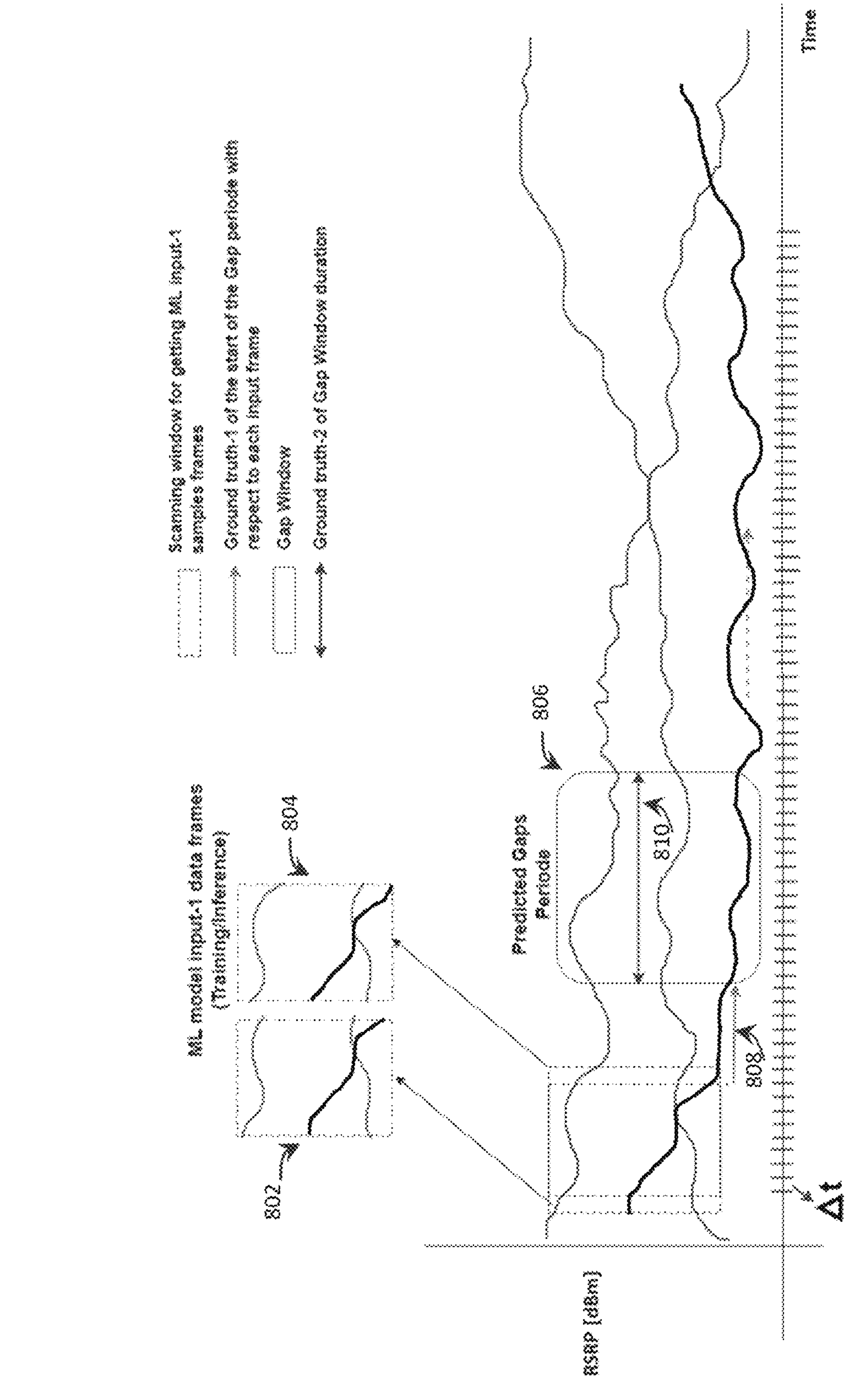
FIG. 8A is a pictorial illustration of a use case of predicting a relaxation period according to an example embodiment.

FIG. 8A is a pictorial illustration of a use case of predicting a relaxation period according to an example embodiment. FIG. 8A shows three (3) received RSRP signals over past time each associated with different cells or beams. Training data can be extracted from FIG. 8A. Input data frames can be collected by setting up a scanning window 802, 804 that will start moving step by step in time and per each step advancing in time the scanning window content can be a new training frame. After collecting the training frames, labels are added. The labels can include a ground truth per input frame that we wish that our ML model will be able to learn and predict later at the inference phase.

The labeling of each input frame can include a looking forward (future with respect to current input frame) to locate a handover area. If not a handover area, the ground truth can be a first ground truth or label 808 (e.g., a start of the relaxation period with respect to end of input frame) to the start of the future period where no handover is expected. Another ground truth can be second ground truth or label 810 as the period of future that time starting from the value of ground truth or label 808, without a handover rectangle 806. Label 808 can be the start of the relaxation period with respect to the end of input frame. Label 810 can be the period of the relaxation period with no handover is expected. Using the input frames and the associated ground truth labels 808, 810 the ML model can be trained to get the input frame and predict the start and period of the relaxation gap. In the UE based relaxation periods a calculation can be made with network assistance and network-based relaxation periods calculation can be made with UE assistance. As shown above, the ML model training could be done at the network or at the user side.

Figure 8B:
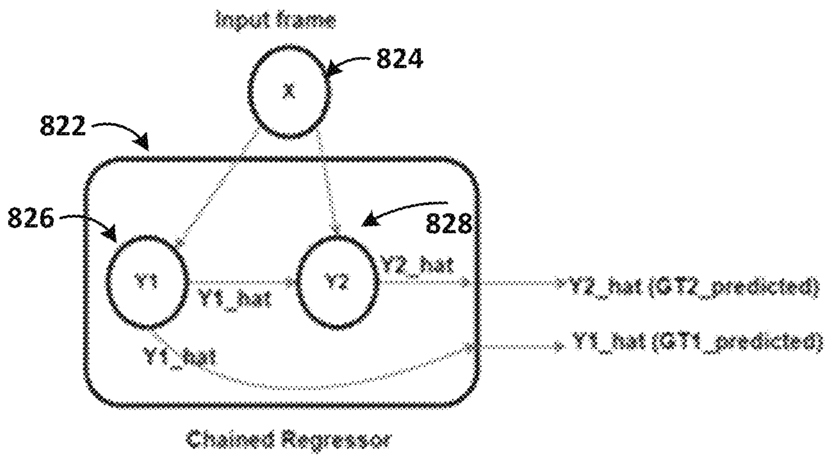
FIG. 8B is a block diagram of a chained regressor according to an example embodiment.

FIG. 8B is a concept block diagram of a chained regressor according to an example embodiment. FIG. 8B can illustrate an architecture for an ML model that can be used for predicting two dependent labels per input. The ML model can be a multi-output regression model. However, in an example implementation, the outputs can be dependent on each other. Therefore, the ML model can be a chained-multi-output regression model 822 illustrated in FIG. 8B. As shown in FIG. 8B, an input 824 can be input to a first regression model 826 and a second regression model 828. The output of the first regression model 826 can be an output of the chained-multi-output regression model 822. The output of the first regression model 826 can also be an input of the second regression model 828. The output of the second regression model 828 can be an output of the chained-multi-output regression model 822.

Figure 8C:
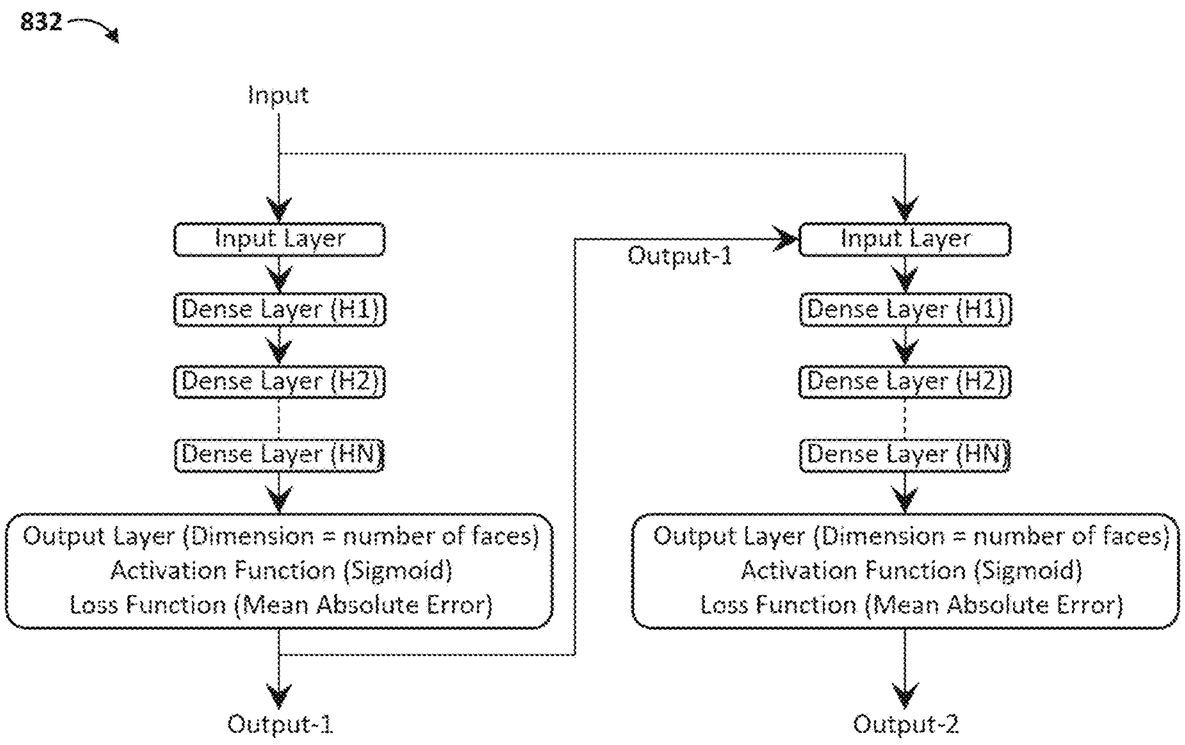
FIG. 8C is a block diagram of a chained regression model according to an example embodiment.

FIG. 8C is a more detailed block diagram of a chained regression model according to an example embodiment. The chained regression model 832 includes a regression model a plurality of dense layers and an output layer. The chained regression model 832 includes two regression models with the output of a first regression model being an output of the chained regression model 832 and an input to the second regression model. The output of the second regression model is also an output of the chained regression model 832.

Figure 9:
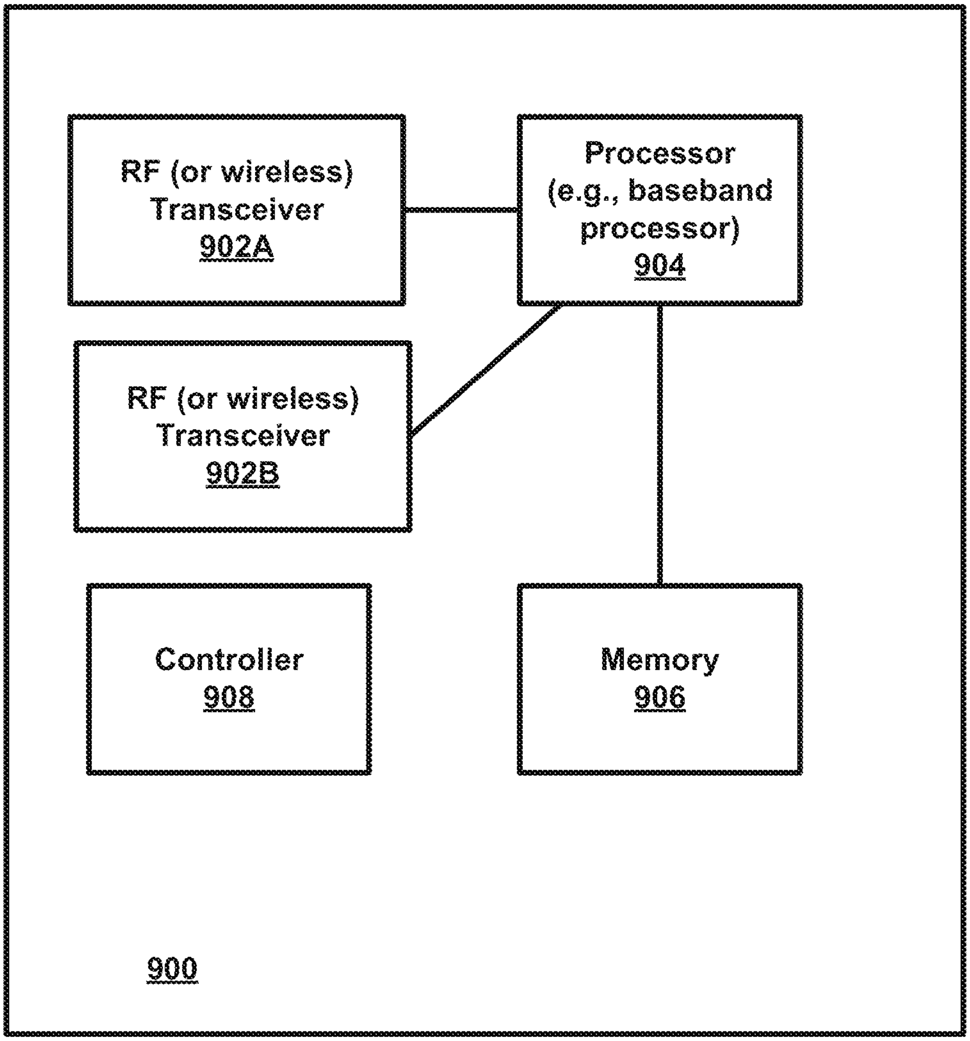
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-UP, . . . or other node according to an example embodiment.

The wireless station 900 may include, for example, one or more (e.g., two as shown in FIG. 9) radio frequency (RF) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above. According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into “building blocks” or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:

at least one processor and at least one memory including computer program code, the at least one memory and the computer program code configured to, with the at least one processor, cause the apparatus to:

communicate, to a network device, a message including a measurement relaxation request;

receive, from the network device, a message including one of a measurement relaxation approval or a measurement relaxation denial; and in response to receiving the measurement relaxation approval:

predict a measurement relaxation configuration using a machine learning model;

communicate, to the network device, a message including the measurement relaxation configuration;

receive, from the network device, a message including a measurement relaxation acknowledgement; and report, to the network device, measurements based on the measurement relaxation configuration, wherein the machine learning model includes an input including at least local received measurements, and wherein the machine learning model is a chained-multi-output regression model comprising a first regression model and a second regression model, wherein an output of the first regression model is an output of the chained-multi-output regression model and an input to the second regression model, and an output of the second regression model is an output of the chained-multi-output regression model, wherein the measurement relaxation approval includes time gap boundaries and per measurement type rules, wherein the predicting of the measurement relaxation configuration includes predicting an optimal measurement relaxation period based on the time gap boundaries and the per measurement type rules.

2. The apparatus of claim 1, wherein:

in response to receiving the measurement relaxation denial, report, to the network device, measurements based on conventional radio resource control measurements configuration from the network device.

3. The apparatus of claim 1, wherein:

the measurement relaxation request includes user equipment (UE) preferences information, and the UE preference information includes UE speed, trajectory, and battery level.

4. The apparatus of claim 1, wherein the machine learning model includes an input including a context information, a trajectory information, and a speed information.

5. The apparatus of claim 1, wherein the measurement relaxation configuration includes measurement relaxation periods indicating when and for how long measurements are made and when the measurements are not made.

6. The apparatus of claim 1, wherein the measurement relaxation configuration indicates a different rate of reporting measurement times than a radio resource control measurements configuration.

7. The apparatus of claim 1, wherein the local received measurements include received reference signal received power (RSRP) signals over time associated with a plurality of different cells or beams.

8. The apparatus of claim 7, wherein the machine learning model is trained using input data frames collected by a scanning window that moves step by step in time, wherein per each step advancing in time the scanning window content is a new training frame.

9. The apparatus of claim 8, wherein training of the machine learning model includes labeling each input data frame by looking forward in time to locate a handover area, the labeling including a start of a relaxation period with respect to an end of the input data frame and a period of the relaxation period during which no handover is expected.

10. The apparatus of claim 9, wherein the output of the first regression model is a start of a measurement relaxation period and the output of the second regression model is a duration of the measurement relaxation period.

11. The apparatus of claim 1, wherein the machine learning model predicts N steps starting from a prediction time, during the N steps there being no measurement reporting, and wherein a periods prediction of the N steps is in an order of a minimum time step.

12. The apparatus of claim 1, wherein the measurement relaxation configuration includes longer measurement relaxation periods for cell center users and short measurement relaxation periods for edge users.

13. An apparatus, comprising:

at least one processor and at least one memory including computer program code, the at least one memory and the computer program code configured to, with the at least one processor, cause the apparatus to:

receive, from a user equipment (UE), a message including a measurement relaxation request;

determine one of a measurement relaxation approval or a measurement relaxation denial;

in response to determining the measurement relaxation denial, communicate to the UE a message including the measurement relaxation denial; and in response to determining the measurement relaxation approval:

determine whether the apparatus is to configure a measurement relaxation configuration, or the UE is to configure the measurement relaxation configuration, in response to determining the UE is to configure the measurement relaxation configuration, communicate to the UE a message including the measurement relaxation approval, in response to determining the apparatus is to configure the measurement relaxation configuration:

predict the measurement relaxation configuration using a machine learning model, and communicate to the UE a message including the measurement relaxation configuration, wherein the machine learning model is a chained-multi-output regression model comprising a first regression model and a second regression model, wherein an output of the first regression model is an output of the chained-multi-output regression model and an input to the second regression model, and an output of the second regression model is an output of the chained-multi-output regression model, wherein the measurement relaxation approval includes time gap boundaries and measurement rules, wherein the predicting of the measurement relaxation configuration includes predicting an optimal measurement relaxation period based on the time gap boundaries and the measurement rules.

14. The apparatus of claim 13, wherein the machine learning model includes an input including a context information, a trajectory information, and a speed information.

15. The apparatus of claim 13, wherein the measurement relaxation configuration includes measurement relaxation periods indicating when measurements are made and for how long, and when measurements are not made; and wherein the measurement relaxation configuration indicates a different rate of reporting measurement times than a radio resource control measurements configuration.

* * * * *